US012623450B2

(12) United States Patent
Short et al.

(10) Patent No.: US 12,623,450 B2
(45) Date of Patent: May 12, 2026

(54) ANGLED PRINTING

(71) Applicant: ASMPT SMT SINGAPORE PTE. LTD., Singapore (SG)

(72) Inventors: Neil Short, Weymouth (GB); Tom Falcon, Stoford (GB)

(73) Assignee: ASMPT SMT SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 18/691,517

(22) PCT Filed: Sep. 7, 2022

(86) PCT No.: PCT/IB2022/058404
§ 371 (c)(1),
(2) Date: Mar. 13, 2024

(87) PCT Pub. No.: WO2023/042034
PCT Pub. Date: Mar. 23, 2023

(65) Prior Publication Data
US 2024/0383246 A1 Nov. 21, 2024

(30) Foreign Application Priority Data
Sep. 14, 2021 (GB) ...................................... 2113138

(51) Int. Cl.
*B41F 15/18* (2006.01)
*B41F 15/34* (2006.01)
*B41F 15/42* (2006.01)

(52) U.S. Cl.
CPC .............. *B41F 15/18* (2013.01); *B41F 15/34* (2013.01); *B41F 15/42* (2013.01)

(58) Field of Classification Search
CPC ........... B41F 15/18; B41F 15/34; B41F 15/42
See application file for complete search history.

(56) References Cited

U.S. PATENT DOCUMENTS 1,096,113 A * 5/1914 Osterholm .............. B25B 27/02 29/283
5,493,969 A 2/1996 Takahashi et al.
2001/0038882 A1 11/2001 Onishi et al.
2005/0268799 A1 12/2005 Pham-Van-Diep et al.
2009/0025582 A1 1/2009 Yeh et al.

FOREIGN PATENT DOCUMENTS

JP 2838753 B2 * 12/1986
JP H05-309822 A 11/1993
JP H05-330011 A 12/1993
JP H07-32580 A 2/1995
JP H10-296950 A 11/1998
(Continued)

OTHER PUBLICATIONS

International Search Report mailed Dec. 21, 2022 in corresponding PCT International Application No. PCT/IB2022/058404.

*Primary Examiner* — Christopher E Mahoney
*Assistant Examiner* — Marissa Ferguson-Samreth
(74) *Attorney, Agent, or Firm* — OSTROLENK FABER LLP

(57) ABSTRACT

The print quality of elongate deposits is improved by introducing an inclination offset between the squeegee blade and the elongate aperture of a stencil during a printing operation.

11 Claims, 5 Drawing Sheets

(56) References Cited

FOREIGN PATENT DOCUMENTS

| | | | | |
|---|---|---|---|---|
| JP | H11-320816 | A | | 11/1999 |
| JP | 2005-161868 | A | | 6/2005 |
| JP | 2008-168587 | A | | 7/2008 |
| JP | 2011-148190 | A | | 8/2011 |
| JP | 2014217981 | | * | 11/2014 |
| KR | 20220005696 | A | * | 1/2022 |

* cited by examiner

ANGLED PRINTING

This invention relates to a method of printing an elongate deposit of print medium onto an elongate deposit target of a workpiece and printing machines.

BACKGROUND AND PRIOR ART

Industrial screen-printing machines typically apply a print medium, which may be a conductive print medium such as solder paste, silver paste or conductive ink, onto a planar workpiece, such as a circuit board, by applying the conductive print medium through a pattern of apertures in a thin planar layer or mask, such as a stencil (which is a patterned solid material such as stainless steel) or a screen which is a mesh material coated with emulsion. The present invention is equally applicable to both screen and stencil printing, and for convenience the term "stencil" will be used to refer to any such patterned mask throughout the remainder of this document. The print medium is applied using a print carriage which includes a squeegee. The same machines may also be used to print certain non-conductive media, such as glue or other adhesive, onto workpieces. The present invention is equally applicable to both conductive and non-conductive print media.

To ensure high quality printing, it is necessary to support the workpiece so that the surface to be printed is parallel to the stencil, generally horizontal, with the workpiece support being capable of withstanding the pressure placed upon it during the printing operation, especially by the downward pressure applied by the squeegee as the print carriage travels across the stencil, while maintaining the correct alignment of the workpiece. The simplest type of support is to use a flat surface or platen on which a workpiece may be placed. However, there are many circumstances where this type of arrangement is not possible, in particular where the underside of a workpiece has previously been printed and equipped with components (for example during a so-called "placement" operation), and this underside needs to be supported during a printing operation applied to the topside of the workpiece. The presence of components on the underside of the workpiece means that the workpiece will not be flat, and also the components are liable to damage if they are "squashed" during a printing operation. It will be appreciated that workpieces also need support during other processes, for example during a placement operation. To this end, specialist support solutions, known as "tooling", are used.

There are currently two common tooling options for providing support for a printed circuit board (PCB) during printing and placement operations:

1) Dedicated tooling blocks—these are blocks whose upper surface is caused, for example by machining, to have a three-dimensional profile designed to accommodate a specific PCB placed thereon. They are relatively expensive, product-specific, and can easily become obsolete when a PCB design changes.
2) Tooling pins—these are thin columns which are positioned to contact the board in use, avoiding contact with any components (or other delicate or critical regions) on the underside. The pins are usually magnetic, i.e. they include either a permanent or an electro-permanent magnet within them, to non-permanently attach the pins to a flat, underlying support plate or "tooling table", which may conveniently be made from a magnetically permeable material such as steel. By way of example, ASM currently uses simple, low-cost, moulded plastics tooling pins with a single Neodymium permanent magnet in the base of each pin.

In this document, the term "tooling" will be used to encompass all such supports, including simple flat platens, tooling blocks and pin supports.

Typically, a workpiece supported by the tooling will be raised into a printing position in which it is pushed upwards into the overlying stencil, and in which a printing operation may be performed. This lifting is achieved by locating the tooling on top of a lifting table (also known as a "tooling table"), which is disposed directly below the printing position and drivable along a vertical axis. At the upper end of the lifting table's range of vertical movement, a workpiece supported on the associated tooling is placed in the printing position, while at the lower end of its range of vertical movement, the workpiece engages with transport means, such as rails or conveyors, which act to transport workpieces to be printed from an input region of the printing machine to a position above the lifting table, and to transport printed workpieces away from the lifting table to an output region of the printing machine at which the printed workpieces may be outputted, for example transferred to another machine in the production line.

FIG. 1 schematically shows, from above, part of an exemplary printing machine 1 for performing the above-described process. It should be understood that throughout the entirety of this document, the X axis and orthogonal Y axis are considered to lie in the horizontal plane, with a mutually orthogonal Z-axis extending vertically upwards. The terms "X direction", "Y direction" and "Z direction" are used to respectively indicate directions parallel to the respective axes and increasing along those axes, i.e. from left to right, from top to bottom, and out of the plane of the paper as shown in FIG. 1. The printing machine 1 includes two conveyors, a front conveyor 2 and a rear conveyor 3 which extend horizontally, parallel to the X axis, through the printing machine 1 from an input region shown at the left side of the printing machine 1 to an output region shown at the right side of the printing machine 1. The front and rear conveyors 2, 3 are operative to transport a succession of planar workpieces W from the input region to the output region, via a printing position, along a transport direction T parallel to the X-direction. A workpiece W1 is shown in the input region and a workpiece W3 is shown in the output region. A workpiece W2 is shown in a printing position, having been lifted by a tooling table (see FIGS. 2A, 2B) into a correspondingly sized opening (10, see FIG. 2A) of a surround plate 4 so that the upper surface of the surround plate is substantially co-planar with the upper surface of the workpiece W2. In this printing position, a print carriage comprising a head unit 5 with a squeegee blade 6 mounted thereto may be moved in a printing operation across the surface of a stencil (i.e. a printing screen or mesh stencil not shown for clarity in FIG. 1) overlying the workpiece W2 and surround plate 4 to impel conductive medium such as solder paste through apertures in the stencil and onto deposit targets 7 of the workpieces to form deposits 8 thereon. The print carriage is mounted to a gantry 9, which is movable parallel to the Y axis so as to perform the printing operation by driving the squeegee blade 6 in a print stroke across the stencil in a printing direction P parallel to the Y direction. It will be understood by those skilled in the art that the print carriage may be driven in both directions parallel to the Y axis, so that print strokes are performed in both positive and negative Y directions, and a pair of opposed squeegee blades may be provided on the head unit for this purpose. For simplicity though, the present document will refer in the main to a single squeegee blade operative to perform a print stroke in a print direction P as shown. It will also be understood by those skilled in the art that the print carriage may be lowered onto the upper surface of a stencil to perform printing operations, and subsequently raised up from the stencil as required, for example to remove conductive medium from the stencil, or exchange the stencil. Following the printing operation, workpiece W2 may be lowered back to the conveyors and moved to the output region.

FIGS. 2A, 2B schematically show, from the side, lifting apparatus for performing the lifting process for a workpiece W. FIG. 2A shows a workpiece W carried by the conveyors (with only front conveyor 2 being visible), positioned along the X axis so as to directly underlie the printing position and opening 10 of surround plate 4. Here, the workpiece W directly overlies tooling 11, which could for example comprise a tooling block or tooling pins etc, which in turn is mounted on a vertically drivable lifting table 12. In FIG. 2B, the workpiece W is shown lifted into the printing position by lifting the lifting table 12, and hence tooling 11 vertically upwards in lifting direction L, so that firstly the tooling 11 contacts the underside of workpiece W and lifts it off the conveyors, then continues to lift the workpiece W into opening 10 of surround plate 4, until the upper surfaces of the workpiece W and surround plate 4 are substantially co-planar. Following completion of the printing operation for workpiece W, the lifting table 12 is lowered back to its starting position shown in FIG. 2A, which places the printed workpiece W back onto the conveyors for transport to the output region.

Certain applications require an elongate deposit of print medium to be printed onto a workpiece, using a corresponding elongate aperture in a stencil. It has been found however that where the major axis of the elongate aperture/elongate deposit is orthogonal to the printing direction, i.e. the direction in which the print carriage travels across the stencil, the print quality may suffer. Such an arrangement is schematically shown in FIG. 1, where the major axis of each deposit target 7 of each workpiece is orthogonal to the printing direction P, and hence parallel to the major axis of the squeegee blade 6. In particular, it has been discovered that with such configurations, there is a tendency for the squeegee blade 6 to "dip" into the apertures of the stencil. This problem is exacerbated since it often not possible to freely set the orientation of the workpieces transported to the printing machine, and thus avoid orthogonality of the elongate deposit target (and hence elongate aperture) and the print direction.

The present invention seeks to address this problem and permit elongate deposits to be printed with consistently high quality.

In accordance with the present invention this aim is achieved by changing the angle subtended between the elongate aperture of the stencil and the squeegee blade. It has been found experimentally that introducing such a relative rotation acts to significantly improve print quality for such long apertures.

SUMMARY OF THE INVENTION

In accordance with a first aspect of the present invention there is provided a method of printing an elongate deposit of print medium onto an elongate deposit target of a workpiece, using a printing machine comprising a print carriage, which, during a printing operation, travels in a printing direction across a stencil provided in the printing machine to force print medium on the stencil into at least one aperture provided in the stencil, the print carriage comprising an elongate squeegee blade with a major axis disposed along the length of the squeegee blade, the method comprising the steps of:

i) transporting the workpiece into the printing machine in an orientation in which the elongate deposit target of the workpiece is orthogonal to the printing direction, ii) aligning the workpiece with a stencil within the printing machine so that an elongate aperture, having a major axis disposed along the length of the elongate aperture, provided in the stencil overlies the elongate deposit target, the stencil being disposed in the printing machine with the major axis of the elongate aperture disposed inclined to the printing direction, by rotating the workpiece so that the elongate deposit target is rotated to underlie the elongate aperture and lifting the workpiece into an opening formed in a surround plate such that upper surfaces of the workpiece and the surround plate are co-planar, the opening having a major axis inclined to the printing direction, and iii) performing a printing operation by driving the print carriage across the stencil in the printing direction, to force print medium on the stencil into the elongate aperture, wherein in step iii) the major axis of the squeegee blade and the major axis of the elongate aperture of the stencil are inclined so as to subtend an angle θ during the printing operation, where $0° < \theta < 90°$.

In accordance with a second aspect of the present invention there is provided a method of printing an elongate deposit of print medium onto an elongate deposit target of a workpiece, using a printing machine comprising a print carriage, which, during a printing operation, travels in a printing direction across a stencil provided in the printing machine to force print medium on the stencil into at least one aperture provided in the stencil, the print carriage comprising an elongate squeegee blade with a major axis disposed along the length of the squeegee blade, the method comprising the steps of:

i) transporting the workpiece into the printing machine in an orientation in which the elongate deposit target of the workpiece is orthogonal to the printing direction, ii) aligning the workpiece with a stencil within the printing machine so that an elongate aperture, having a major axis disposed along the length of the elongate aperture, provided in the stencil overlies the elongate deposit target, iii) performing a printing operation by driving the print carriage across the stencil in the printing direction with the major axis of the squeegee blade inclined to the printing direction so as to subtend an angle α during the printing operation, where $0° < \alpha < 90°$, to force print medium on the stencil into the elongate aperture, the major axis of the squeegee blade and the major axis of the elongate aperture of the stencil being inclined so as to subtend an angle θ during the printing operation, where $0° < \theta < 90°$; and iv) moving the squeegee blade in a horizontal direction orthogonal to the printing direction during the printing operation.

In accordance with a third aspect of the present invention there is provided a printing machine operative to print print medium onto a workpiece in a printing operation by driving a print carriage in a printing direction across a stencil provided in the printing machine to force print medium on the stencil into at least one aperture provided in the stencil, the printing machine comprising:

a movable gantry, a drive configured to move the gantry in the printing direction, and a print carriage comprising:

a head unit mounted to the gantry for movement therewith, and an elongate squeegee blade, the squeegee blade having a major axis disposed along the length of the squeegee blade, the squeegee blade being mounted to the head unit, wherein the squeegee blade may be disposed in an inclined configuration in which the major axis of the squeegee blade is inclined to the printing direction so as to subtend an angle α during the printing operation, where 0°<α<90°, and wherein the squeegee is horizontally movable relative to the gantry with at least a component of horizontal movement in a direction orthogonal to the printing direction.

In accordance with a fourth aspect of the present invention there is provided a printing machine operative to print a print medium onto a workpiece located in a printing position of the printing machine by driving a print carriage in a printing direction across a stencil provided in the printing machine to force print medium on the stencil into at least one aperture provided in the stencil, the printing machine comprising:

an input region for receiving workpieces to be printed, an output region for outputting printed workpieces, a lifting table which is movable along a vertical axis, the lifting table being disposed directly below the printing position, a print carriage drivable in the printing direction over the printing position, transport means for successively transporting a plurality of workpieces from the input region to a position directly above the lifting table, and subsequently transporting the plurality of workpieces away from the lifting table to an output region of the printing machine, tooling mounted on the lifting table, the tooling comprising a tooling support surface for supporting a workpiece thereon, configured so that moving the lifting table vertically upwards causes a workpiece supported on the tooling support surface to be moved to the printing position, and a surround plate having an opening to receive a workpiece in the printing position, wherein the opening has a major axis inclined to the printing direction, wherein the tooling support surface is rotatable with respect to the table about the vertical axis and operative to successively rotate each of the plurality of workpieces supported thereon a predetermined angle of rotation about the vertical axis, so that a workpiece located in the printing position is rotated about the vertical axis relative to a workpiece located in the input region of the printing machine.

Other specific aspects and features of the present invention are set out in the accompanying claims.

BRIEF DESCRIPTION OF THE DRAWINGS

The invention will now be described with reference to the accompanying drawings (not to scale), in which.

DETAILED DESCRIPTION OF THE PREFERRED EMBODIMENTS OF THE INVENTION

Figure 3:
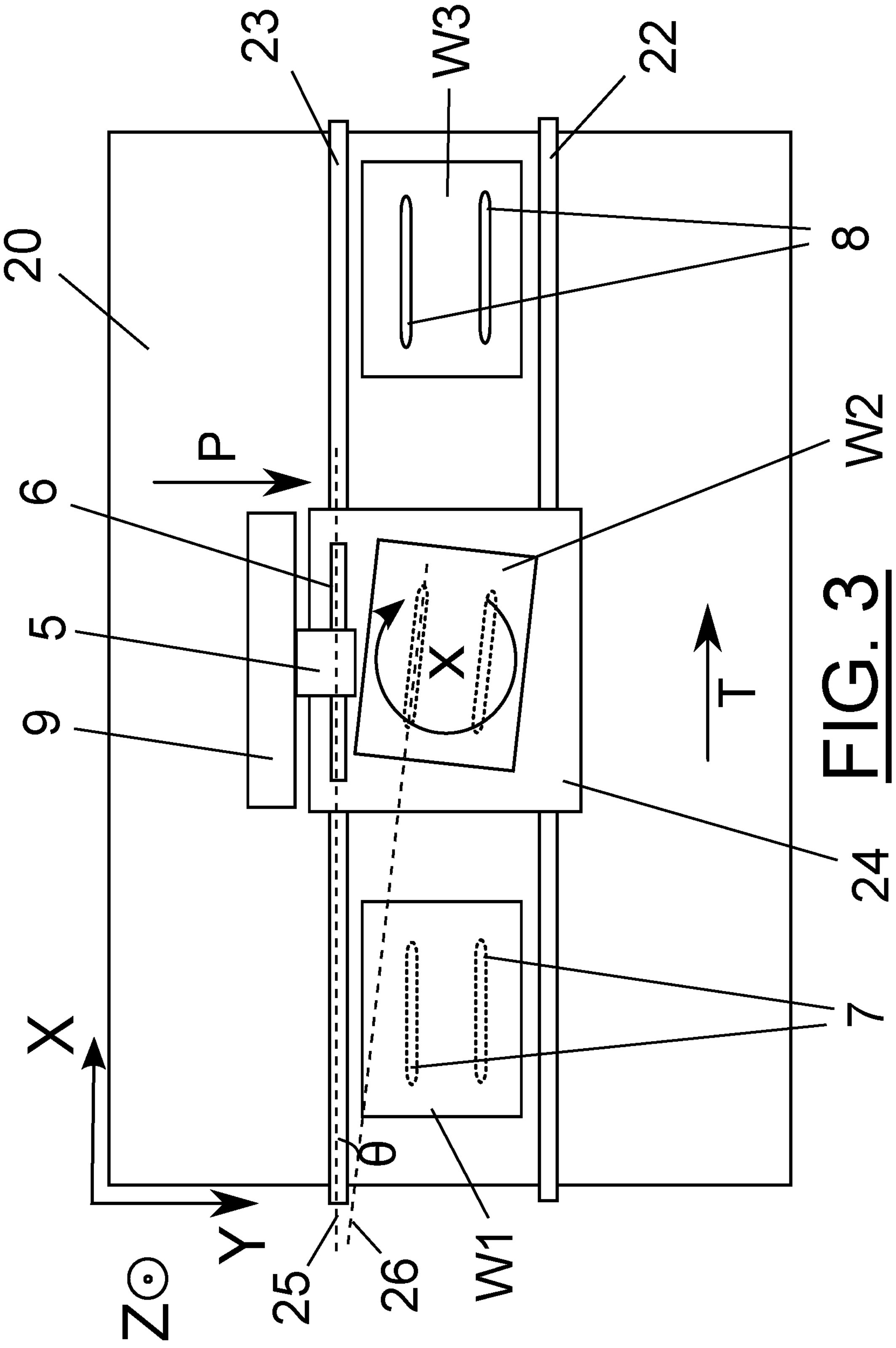
FIG. 3 schematically shows, from above, part of a printing machine in accordance with an embodiment of the present invention.

A printing machine 20 according to a first embodiment of the present invention is schematically shown from above in FIG. 3. FIG. 3 is similar to FIG. 1, and, where possible, reference numerals have been retained for similar items.

The printing machine 20 includes two conveyors, a front conveyor 22 and a rear conveyor 23 which extend horizontally, parallel to the X axis, through the printing machine 20 from an input region shown at the left side of the printing machine 20 to an output region shown at the right side of the printing machine 20. The front and rear conveyors 22, 23 are operative to transport a succession of planar workpieces W from the input region to the output region, via a printing position, along a transport direction T parallel to the X-direction. A workpiece W1 is shown in the input region and a workpiece W3 is shown in the output region. A workpiece W2 is shown in a printing position, having been lifted by a tooling table (see FIGS. 4A, 4B) into a correspondingly sized opening (30, see FIG. 4A) of a surround plate 24 so that the upper surface of the surround plate is substantially co-planar with the upper surface of the workpiece W2. In this printing position, a print carriage comprising a head unit 5 with a squeegee blade 6 mounted thereto may be moved in a printing operation across the surface of a stencil (not shown for clarity in FIG. 3) overlying the workpiece W2 and surround plate 24 to impel print medium such as solder paste (not shown) through elongate apertures in the stencil and onto correspondingly elongate deposit targets 7 of the workpieces to form elongate deposits 8 thereon.

Use of a surround plate 24 in accordance with the present invention is advantageous in that the surround plate 24 prevents sections of the squeegee blade 6 from exerting a bending or damaging force onto unsupported areas of the stencil during a printing operation, and additionally provides a smooth transition for the squeegee blade 6 when it moves from its “run-up” position at a preliminary stage of the printing operation, typically some millimetres away from the workpiece W2, to being directly over the workpiece W2.

The print carriage is mounted to a gantry 9, which is movable parallel to the Y axis so as to perform the printing operation by driving the squeegee blade 6 in a print stroke across the stencil in a printing direction P parallel to the Y direction. The print carriage may be driven in both directions parallel to the Y axis, so that print strokes are performed in both positive and negative Y directions, and a pair of opposed squeegee blades may be provided on the head unit for this purpose. The print carriage may be lowered onto the upper surface of a stencil to perform printing operations, and subsequently raised up from the stencil as required, for example to remove print medium from the stencil, or exchange the stencil, as is well-known in the art per se. Following the printing operation, workpiece W2 may be lowered back to the conveyors and moved to the output region.

Figure 1:
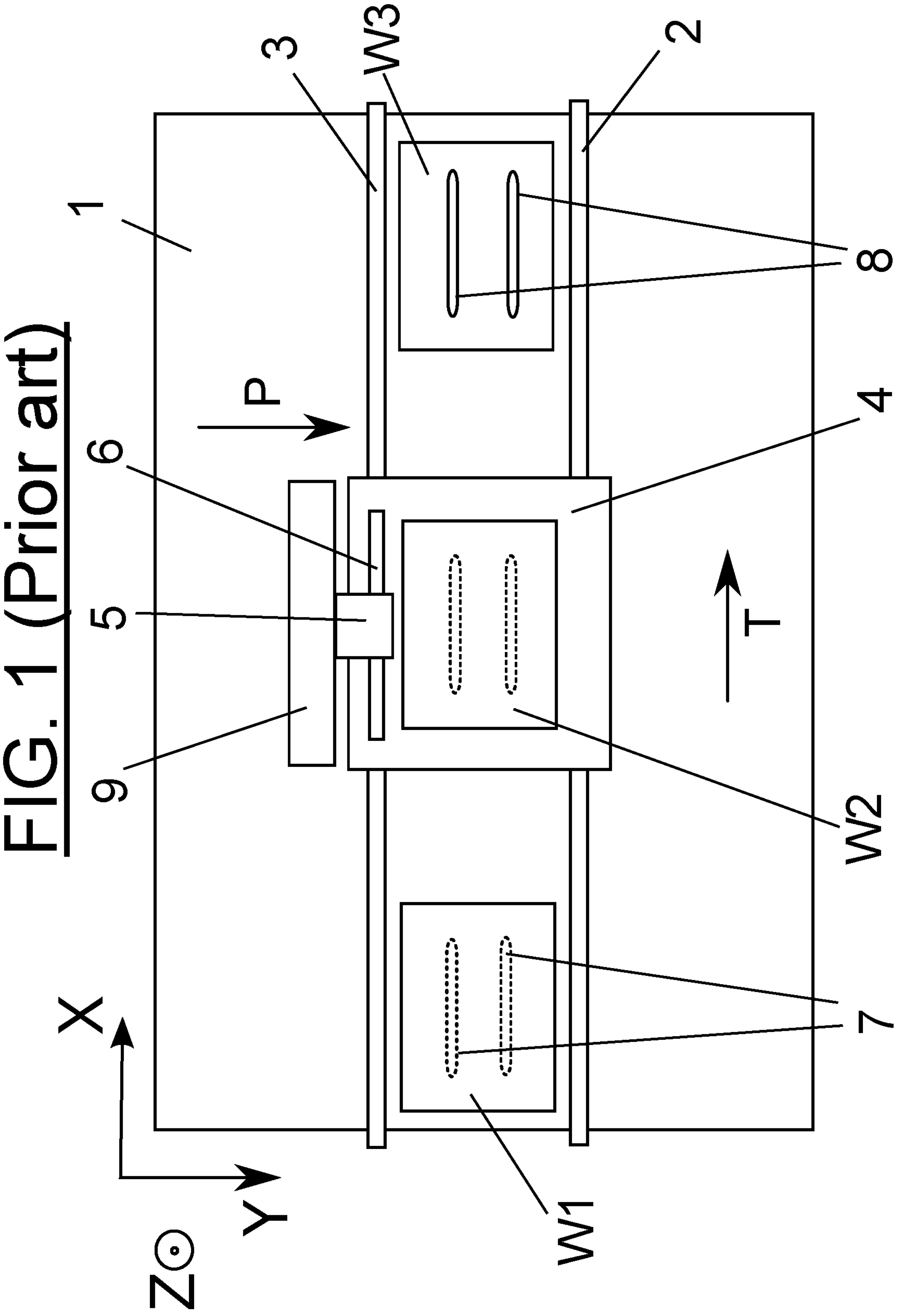
FIG. 1 (Prior art)
FIG. 1 schematically shows part of a known printing machine from above.
Figure 2A:
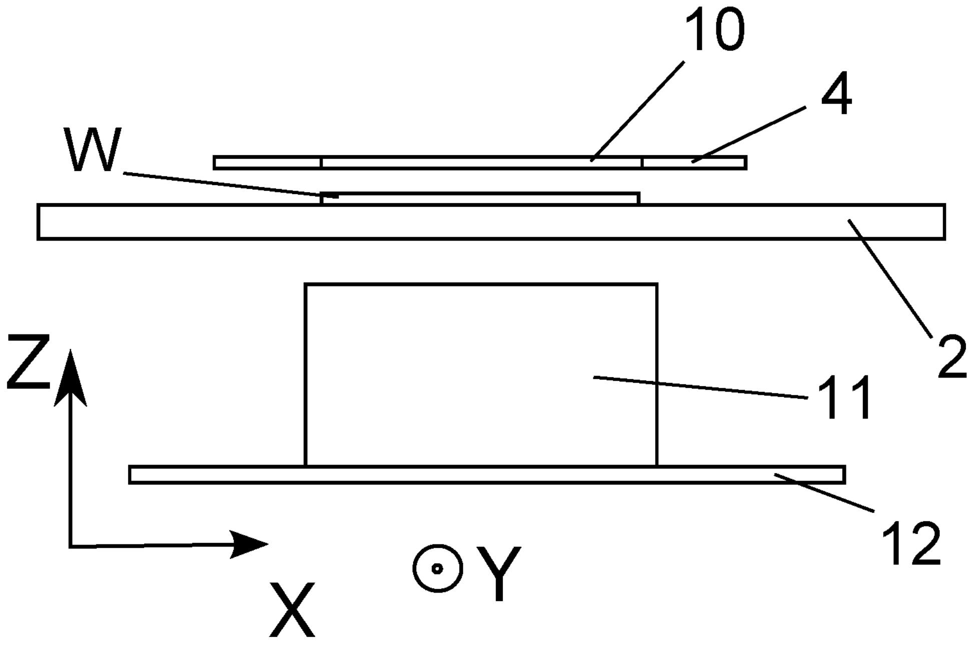
FIG. 2A (Prior art)
FIGS. 2A, 2B schematically show lifting apparatus of a known printing machine from the side in lowered and raised configurations respectively.
Figure 2B:
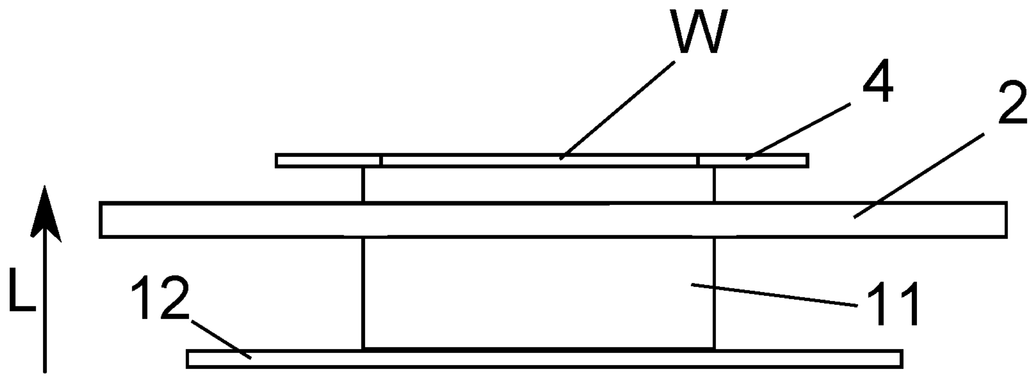
FIG. 2B (Prior art)

As shown in FIG. 3, the squeegee blade 6 is elongate, with a major axis 25 disposed along its length. In addition, the apertures of the stencil are elongate, having respective major axes 26 disposed along the length of the respective elongate apertures. Since the apertures closely correspond to the deposit targets of the workpiece W2 when it is in the printing position, it can be seen from FIG. 3 that each aperture major axis 26 also aligns with the major axes of the deposit targets 7 while the workpiece W2 is in the printing position. Furthermore, and in accordance with the present invention, the major axis of the squeegee blade 25 and the major axis 26 of each elongate aperture of the stencil are inclined so as to subtend an angle θ during the printing operation, where $0° < \theta < 90°$. As particular examples, θ may lie in the ranges $1° < \theta < 30°$, $5° < \theta < 20°$, or $5° < \theta < 15°$. In comparison, the equivalent angle subtended by these axes in the known arrangement of FIG. 1 is 0°. The workpiece W2 is therefore rotated about a vertical axis (shown as "+" in FIG. 3) parallel to the Z-axis, relative to its orientation at the input region. This change in angle is achieved in this embodiment by rotating the workpiece W while it is supported by tooling, in fact the tooling is used to effect the rotation of the supported workpiece W. To accommodate the rotated workpiece W, the surround plate 24 is provided with an opening (30, see FIG. 4A) which is similarly inclined, as can be seen by comparing FIGS. 3 and 1. For the avoidance of doubt, the stencil used for this printing operation will be different to that used in FIG. 1, with the elongate apertures formed therein now angled so that their major axes are inclined to the printing direction P (i.e. inclined to the Y axis) by an angle $90° - \theta$.

Figure 4A:
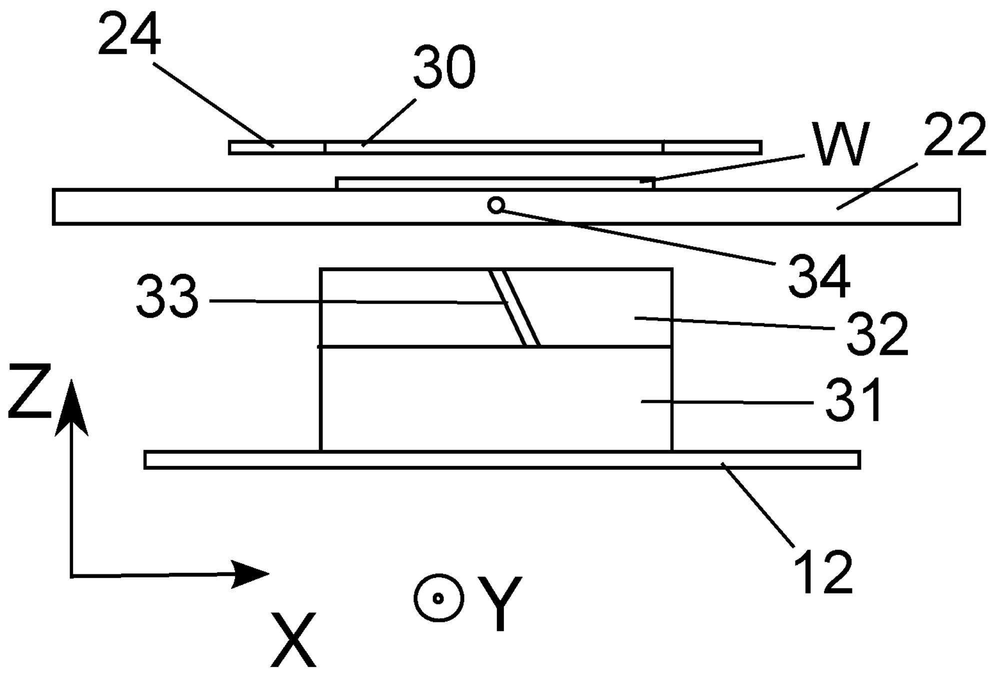
FIGS. 4A, 4B schematically show, from the side, lifting apparatus of the printing machine of FIG. 3 in lowered and raised configurations respectively.
Figure 4B:
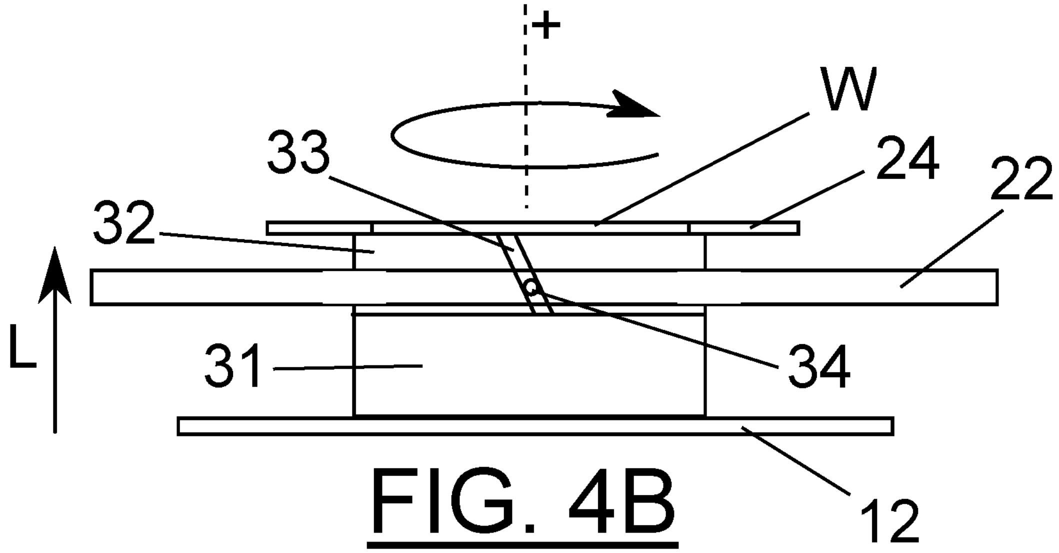

FIGS. 4A, 4B schematically show in side view lifting apparatus for performing the lifting process for a workpiece W. FIG. 4A shows a workpiece W carried by the conveyors (with only front conveyor 22 being visible), positioned along the X axis so as to directly underlie the printing position and opening 30 of surround plate 24. Here, the workpiece W directly overlies tooling. The tooling comprises a tooling base 31 mounted on a vertically drivable lifting table 12. A tooling rotor 32, being a rotatable part of the tooling, is rotatably mounted on the tooling base 31 so that it may rotate relative to the tooling base 31 about a vertical axis (parallel to the Z-axis). In FIG. 4A, the tooling rotor 32 is shown as a tooling block whose upper surface provides a support surface for the workpiece W thereon, however other types of tooling, such as tooling pins etc, could be provided on the tooling rotor. In the case of tooling pins for example, the upper ends of the pins together form a composite tooling support surface for the workpiece W, and all the pins, and thus the composite support surface, would rotate with the tooling rotor. The tooling and the printing machine comprise respective members which mutually engage to convert vertical movement of the tooling into rotation of the tooling rotor 32, such that lifting of the tooling produces a predetermined rotation of the tooling rotor about the vertical axis. Here, a projecting pin or key 34 is provided on the front conveyor 22 of the printing machine to act as the first member, while a corresponding slot or keyway 33 is provided on the tooling rotor 32. In the lowered tooling position shown in FIG. 4A, it can be seen that the upper opening of the keyway 33 lies directly below the key 34.

In FIG. 4B, the workpiece W is shown lifted into the printing position by lifting the lifting table 12, and hence the tooling and workpiece W, vertically upwards in lifting direction L, so that firstly the tooling contacts the underside of workpiece W and lifts it off the conveyors, then continues to lift the workpiece W into opening 30 of surround plate 24, until the upper surfaces of the workpiece W and surround plate 24 are substantially co-planar. During this lifting, the key 34 enters the keyway 33 and causes the tooling rotor 32 and workpiece W supported thereon to rotate about the vertical axis +. Since rotation is effected mechanically, the rotation amount is predetermined, precise and repeatable for each workpiece W.

Following completion of the printing operation for workpiece W, the lifting table 12 is lowered back to its starting position shown in FIG. 4A, which places the printed workpiece W back onto the conveyors for transport to the output region. During lowering, the tooling rotor 32 and the workpiece W supported thereon are rotated back to the original position shown in FIG. 4A.

The apparatus described above may thus be operated as follows:

i) a workpiece to be printed with at least one elongate deposit is transported into the printing machine at the input region in an orientation in which the elongate deposit target of the workpiece aligns with the printing direction, ii) the workpiece is transported by the conveyors to a position directly above the tooling and directly below a stencil provided within the printing machine, the stencil having at least one elongate aperture which is not parallel to the printing direction, iii) the workpiece is lifted up onto the tooling and continues being lifted up to the stencil. During lifting, the workpiece is rotated by a predetermined rotation angle θ so that the elongate deposit target aligns with the elongate aperture of the stencil, iv) a printing operation is performed by driving the print carriage across the stencil in the printing direction, forcing print medium through each elongate aperture and onto each deposit target, v) following printing, the workpiece is lowered back down to the conveyors. During lowering, the workpiece rotates back to its input orientation, and vi) the printed workpiece is then transported on the conveyors to the output region and hence exits the printing machine. At the same time, a new workpiece to be printed is transported from the input region to the tooling.

Figures 5A, 5B:
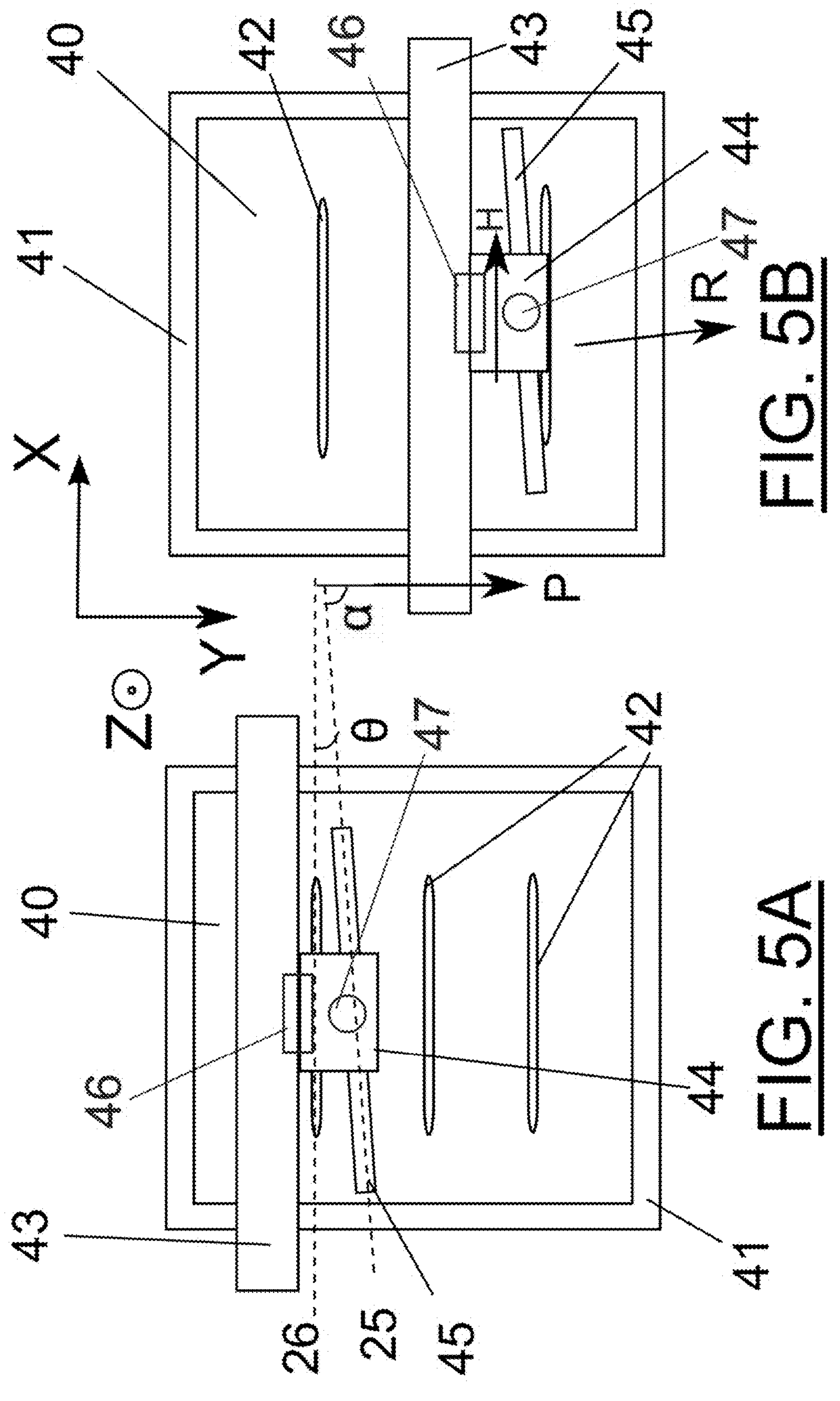
FIGS. 5A, 5B schematically show, from above, part of a printing machine according to another embodiment of the present invention at time-spaced instances of a printing operation.

FIGS. 5A and 5B schematically show, from above, part of a printing machine according to another embodiment of the present invention at time-spaced instances of a printing operation. FIG. 5A shows a stencil 40 which is held within and tensioned by a stencil frame 41, as is well known in the art per se. These components may be loaded into a printing machine as required. The stencil 40 includes a plurality of elongate apertures 42 for allowing the deposit of print medium onto corresponding elongate deposit targets of a workpiece (not shown) aligned underneath the stencil 40. The major axis of each elongate aperture 42 is parallel to the Y axis, with one such aperture major axis 26 being shown. A movable gantry 43, which is movable in a printing direction P, parallel to the Y axis is provided above the stencil 40, and carries a print carriage. The print carriage comprises a head unit 44 mounted to the gantry 43, and a squeegee blade 45 mounted to the head unit 44. As shown, the squeegee blade 45 is elongate, having a squeegee blade major axis 25 disposed along its length. In this embodiment, the squeegee blade 45 may be disposed in an inclined configuration in which the squeegee blade major axis 25 is inclined to the printing direction P so as to subtend an angle $\alpha$ during the printing operation, where $0° < \alpha < 90°$, and with the squeegee blade major axis 25 inclined to the aperture major axis 26 so as to subtend an angle $\theta$ during the printing operation, where $0° < \theta < 90°$. In the particular example shown, where the aperture major axis 26 is exactly orthogonal to the printing direction P, it will be evident that $\theta + \alpha = 90°$, however it will be appreciated that the printing apparatus machine in FIGS. 5A and 5B can be used with any patterned stencil. In addition, the squeegee blade 45 is horizontally movable relative to the gantry 43 with at least a component of horizontal movement in a lateral squeegee motion direction (H, see FIG. 5B) orthogonal to the printing direction P. This motion may be produced by a linear actuator 46 which is operative to drive the head unit 44 along the gantry 43 (as shown in FIGS. 5A, 5B), or alternatively to drive the squeegee blade 45 relative to the head unit 44. This horizontal movement is beneficial in that it counteracts the accumulation of print medium at the trailing edge (i.e. the right-most end as shown) of the squeegee blade 45.

FIG. 5A shows the print carriage near the start of its print stroke, while FIG. 5B shows the print carriage near the completion of the print stroke, after the gantry 43 has moved further in the printing direction P. It can be seen that the squeegee blade 45 has also moved in the direction H, in fact the squeegee is configured to move at a constant speed in the lateral squeegee motion direction H during the print operation, while the gantry 43 moves at a constant speed in the printing direction P. The resultant squeegee motion direction R of the squeegee during the print stroke, which is the vector sum of its motion in the printing direction P and the lateral squeegee motion H during the print stroke, is therefore inclined to the Y-axis and aperture major axis 26. Preferably, the speeds of squeegee blade motion in the printing direction P and the lateral squeegee motion H are set so that the resultant squeegee motion direction R is orthogonal to the squeegee blade major axis 25. With this movement profile, parallelism between the squeegee movement and the elongate apertures 42 is avoided, improving print quality for these apertures 42.

This arrangement may be provided in various ways. For example, the squeegee blade 45 may be rotatable relative to the head unit 44 about a vertical axis into the inclined configuration. Alternatively, the head unit 44, carrying squeegee blade 45, may be rotatable relative to the gantry 43 about a vertical axis into the inclined configuration. In either case, a rotary actuator 47 may be provided which is operative to rotate the squeegee blade 45 about a vertical axis into the inclined configuration and back to a standard configuration in which it is orthogonal to the printing direction P. This means that the same print carriage may be used both for standard printing operations and for inclined operations as described above. Alternatively, the squeegee blade 45 and/or the head unit 44 may be mounted to the gantry 43 in the inclined configuration—either a dedicated print carriage is used for inclined printing operations, or the mounting interface between the squeegee blade 45 and/or the head unit 44 to the head unit 44 or gantry 43 may allow mounting at either standard or inclined configurations. Furthermore, in some embodiments, the squeegee blade 45 may be disposed at a plurality of inclined configurations, such that at each respective inclined configuration the squeegee blade major axis 25 is inclined to the printing direction P so as to subtend a different respective angle $\alpha$ during the printing operation, to provide additional flexibility of operation.

The above-described embodiments are exemplary only, and other possibilities and alternatives within the scope of the invention will be apparent to those skilled in the art. For example, with respect to the embodiment described with reference to FIG. 3, the whole tooling could rotate relative to the lifting table, so that the whole tooling would constitute a tooling rotor. Rotation of the tooling rotor may be achieved in various different ways, for example by using standard forms of cam members, or by providing mutually engaging indexing components located on the tooling rotor and surround plate, by directly driving rotation using a rotary actuator provided on the lifting table, or by using a linear actuator to apply a torque to the tooling rotor. Furthermore, rotation of the tooling rotor may be both positive or negative, i.e. the tooling rotor could be caused to rotate in either a clockwise or anticlockwise direction about its axis of rotation. Similarly, the major axis of the squeegee blade (with reference to the embodiment described with reference to FIGS. 5A, 5B) could be inclined relative to the printing direction P in a positive or negative angle.

REFERENCE NUMERALS USED

1—Printing machine
2—Front conveyor
3—Rear conveyor
4—Surround plate
5—Head unit
6—Squeegee blade
7—Deposit targets
8—Deposits
9—Gantry
10—Opening
11—Tooling
12—Lifting table
20—Printing machine
22—Front conveyor
23—Rear conveyor
24—Surround plate
25—Squeegee blade major axis
26—Aperture major axis
30—Opening
31—Tooling base
32—Tooling rotor
33—Keyway
34—Key
40—Printing stencil
41—Printing stencil frame
42—Apertures
43—Gantry
44—Head unit
45—Squeegee blade
46—Linear actuator
47—Rotary actuator
W—Workpiece
W1—Workpiece in input region
W2—Workpiece in printing position
W3—Workpiece in output region
T—Transport direction
P—Printing direction
L—Lifting direction
H—Lateral squeegee motion direction
R—Resultant squeegee motion direction
$\theta$—Angle subtended by squeegee blade major axis and aperture major axis α—Angle subtended by the squeegee blade major axis and the printing direction +—Axis of rotation

The invention claimed is:

1. A method of printing an elongate deposit of print medium onto an elongate deposit target of a workpiece, using a printing machine comprising a print carriage, which, during a printing operation, travels in a printing direction across a stencil provided in the printing machine to force print medium on the stencil into at least one aperture provided in the stencil, the print carriage comprising an elongate squeegee blade with a major axis disposed along the length of the squeegee blade, the method comprising the steps of:

i) transporting the workpiece into the printing machine in an orientation in which the elongate deposit target of the workpiece is orthogonal to the printing direction, ii) aligning the workpiece with a stencil within the printing machine so that an elongate aperture, having a major axis disposed along the length of the elongate aperture, provided in the stencil overlies the elongate deposit target, the stencil being disposed in the printing machine with the major axis of the elongate aperture disposed inclined to the printing direction, by rotating the workpiece so that the elongate deposit target is rotated to underlie the elongate aperture and lifting the workpiece into an opening formed in a surround plate such that upper surfaces of the workpiece and the surround plate are co-planar, the opening having a major axis inclined to the printing direction, and iii) performing a printing operation by driving the print carriage across the stencil in the printing direction, to force print medium on the stencil into the elongate aperture, wherein in step iii) the major axis of the squeegee blade and the major axis of the elongate aperture of the stencil are inclined so as to subtend an angle θ during the printing operation, where 0°<θ<90°, wherein step i) comprises transporting the workpiece to overlie tooling in the printing machine, and step ii) comprises bringing the tooling into engagement with the workpiece, and rotating it with the workpiece, wherein step ii) comprises lifting the tooling, with the workpiece supported thereon, toward the stencil, and rotating at least part of the tooling during the lifting, and wherein the tooling and the printing machine comprise a respective key and keyway which mutually engage to convert vertical movement of the tooling into rotation of a tooling rotor, such that lifting of the tooling produces a predetermined rotation of the tooling rotor about the vertical axis.

2. A method of printing an elongate deposit of print medium onto an elongate deposit target of a workpiece, using a printing machine comprising a print carriage, which, during a printing operation, travels in a printing direction across a stencil provided in the printing machine to force print medium on the stencil into at least one aperture provided in the stencil, the print carriage comprising an elongate squeegee blade with a major axis disposed along the length of the squeegee blade, the method comprising the steps of:

i) transporting the workpiece into the printing machine in an orientation in which the elongate deposit target of the workpiece is orthogonal to the printing direction, ii) aligning the workpiece with a stencil within the printing machine so that an elongate aperture, having a major axis disposed along the length of the elongate aperture, provided in the stencil overlies the elongate deposit target, iii) performing a printing operation by driving the print carriage across the stencil in the printing direction with the major axis of the squeegee blade inclined to the printing direction so as to subtend an angle α during the printing operation, where 0°<α<90°, to force print medium on the stencil into the elongate aperture, the major axis of the squeegee blade and the major axis of the elongate aperture of the stencil being inclined so as to subtend an angle θ during the printing operation, where 0°<θ<90°; and iv) moving the squeegee blade in a horizontal direction orthogonal to the printing direction during the printing operation.

3. The method of claim 2, comprising the step of rotating the squeegee blade relative to the printing machine about a vertical axis prior to performing step iii).

4. A printing machine operative to print a print medium onto a workpiece in a printing operation by driving a print carriage in a printing direction across a stencil provided in the printing machine to force print medium on the stencil into at least one aperture provided in the stencil, the printing machine comprising:

a movable gantry, a drive configured to move the gantry in the printing direction, and a print carriage comprising:

a head unit mounted to the gantry for movement therewith, and an elongate squeegee blade, the squeegee blade having a major axis disposed along the length of the squeegee blade, the squeegee blade being mounted to the head unit, wherein the squeegee blade may be disposed in an inclined configuration in which the major axis of the squeegee blade is inclined to the printing direction so as to subtend an angle α during the printing operation, where 0°<α<90°, and wherein the squeegee is horizontally movable relative to the gantry with at least a component of horizontal movement in a direction orthogonal to the printing direction.

5. The printing machine of claim 4, wherein the squeegee blade is rotatable relative to the head unit into the inclined configuration.

6. The printing machine of claim 5, wherein the head unit is rotatable relative to the gantry into the inclined configuration.

7. The printing machine of claim 4, comprising a rotary actuator operative to rotate the squeegee blade into the inclined configuration.

8. The printing machine of claim 4, wherein the squeegee blade may be disposed at a plurality of inclined configurations, such that at each respective inclined configuration the major axis of the squeegee blade is inclined to the printing direction so as to subtend a different respective angle α during the printing operation.

9. The printing machine of claim 4, wherein the head unit is horizontally movable relative to the gantry with at least a component of horizontal movement in a direction orthogonal to the printing direction.

10. The printing machine of claim 4, comprising a linear actuator operative to move the squeegee horizontally relative to the gantry in a direction orthogonal to the printing direction.

11. A printing machine operative to print conductive medium onto a workpiece located in a printing position of the printing machine by driving a print carriage in a printing direction across a stencil provided in the printing machine to force print medium on the stencil into at least one aperture provided in the stencil, the printing machine comprising:

an input region for receiving workpieces to be printed, an output region for outputting printed workpieces, a lifting table which is movable along a vertical axis, the lifting table being disposed directly below the printing position, a print carriage drivable in the printing direction over the printing position, transport means for successively transporting a plurality of workpieces from the input region to a position directly above the lifting table, and subsequently transporting the plurality of workpieces away from the lifting table to an output region of the printing machine, tooling mounted on the lifting table, the tooling comprising a tooling support surface for supporting a workpiece thereon, configured so that moving the lifting table vertically upwards causes a workpiece supported on the tooling support surface to be moved to the printing position, and a surround plate having an opening to receive a workpiece in the printing position, wherein the opening has a major axis inclined to the printing direction, wherein the tooling support surface is rotatable with respect to the table about the vertical axis and operative to successively rotate each of the plurality of workpieces supported thereon a predetermined angle of rotation about the vertical axis, so that a workpiece located in the printing position is rotated about the vertical axis relative to a workpiece located in the input region of the printing machine, wherein the tooling and the printing machine comprise respective members which mutually engage to convert vertical movement of the tooling into rotation of the tooling support surface, and wherein the members comprise respective ones of a key and a keyway.

* * * * *